(12) United States Patent
Sweers et al.

(10) Patent No.: US 11,305,893 B2
(45) Date of Patent: Apr. 19, 2022

(54) ENABLEMENT OF AIRCRAFT OPERATION WITH LIMITED INSPECTION AFTER A LIGHTNING STRIKE AND BEFORE PERFORMANCE OF AN EXTENDED CONDITIONAL INSPECTION FOR LIGHTNING STRIKE DAMAGE OF THE AIRCRAFT

(71) Applicant: THE BOEING COMPANY, Chicago, IL (US)

(72) Inventors: Gregory J. Sweers, Renton, WA (US); Aydin Akdeniz, Langley, WA (US); Blake A. Bertrand, Port Orchard, WA (US)

(73) Assignee: THE BOEING COMPANY, Chicago, IL (US)

( * ) Notice: Subject to any disclaimer, the term of this patent is extended or adjusted under 35 U.S.C. 154(b) by 325 days.

(21) Appl. No.: 16/563,464

(22) Filed: Sep. 6, 2019

(65) Prior Publication Data
US 2021/0070473 A1 Mar. 11, 2021

(51) Int. Cl.
| | | |
|---|---|---|
| *B64F 5/60* | (2017.01) | |
| *B64F 5/40* | (2017.01) | |
| *G07C 5/00* | (2006.01) | |
| *B64D 45/02* | (2006.01) | |

(52) U.S. Cl.
CPC ............... *B64F 5/60* (2017.01); *B64F 5/40* (2017.01); *G07C 5/006* (2013.01); *B64D 45/02* (2013.01)

(58) Field of Classification Search
CPC ... B64F 5/60; B64F 5/40; G07C 5/006; G07C 5/0841; G07C 5/008; B64D 45/02
See application file for complete search history.

(56) References Cited

U.S. PATENT DOCUMENTS

| | | | |
|---|---|---|---|
| 2013/0166458 A1* | 6/2013 | Wallner | B64F 5/40 705/305 |
| 2016/0077027 A1* | 3/2016 | Sweers | B29C 66/45 324/654 |
| 2017/0098197 A1* | 4/2017 | Yu | G06Q 30/02 |
| 2019/0050390 A1 | 2/2019 | Subramania et al. | |

FOREIGN PATENT DOCUMENTS

EP 2664548 A2 * 11/2013 .......... G01M 5/0033

OTHER PUBLICATIONS

Sweers, Greg, Bruce Birch, and John Gokcen. "lightning Strikes: Protection, inspection, and repair." Aero Magazine 4 (2012): 19-28. (Year: 2012).*

Sweers, Greg, et al., "Lightning Strikes: Protection, Inspection, and Repair," Aero Quarterly, Q4, <www.boeing.com/BoeingEdge/aeromagazine> downloaded Sep. 4, 2019, pp. 19-28.

* cited by examiner

*Primary Examiner* — James J Lee
*Assistant Examiner* — Andrew Sang Kim
(74) *Attorney, Agent, or Firm* — Moore IP Law

(57) ABSTRACT

A method of evaluating continued usage of a particular type of aircraft after a lightning strike includes performing structure assessments of one or more structures of the type of aircraft based on one or more representative values for lightning strike damage for the type of aircraft. The method also includes determining a number indicating how many flights an aircraft of the type of aircraft can fly after a lightning strike and before performing an extended conditional inspection for lightning strike damage.

20 Claims, 6 Drawing Sheets

US 11,305,893 B2

ENABLEMENT OF AIRCRAFT OPERATION WITH LIMITED INSPECTION AFTER A LIGHTNING STRIKE AND BEFORE PERFORMANCE OF AN EXTENDED CONDITIONAL INSPECTION FOR LIGHTNING STRIKE DAMAGE OF THE AIRCRAFT

FIELD OF THE DISCLOSURE

The present disclosure is generally related to enablement of aircraft operation with limited inspection after a lightning strike and before performance of an extended conditional inspection for lightning strike damage to the aircraft.

BACKGROUND

Lightning strikes can affect operator operations and cause costly delays and service interruptions for entities associated with aircraft (e.g., passenger airlines, cargo carriers, military forces, etc.). Some lightning strikes to aircraft result in no observable damage to structure of the aircraft. Other lightning strikes can cause damage to structures of the aircraft at contact points of the lightning on the aircraft, at exit points of the lightning from the aircraft, or both. Often such damage is visually observable as pits, burn marks, or holes. The damage can be grouped in one location or divided around a large area.

When an aircraft is struck by lightning, the aircraft is grounded and cannot be used for service until the aircraft undergoes a thorough inspection, referred to as an extended conditional inspection for lightning strike damage. The extended conditional inspection for lightning strike damage, as provided by the aircraft manufacturer in a maintenance manual for the aircraft, includes examining external surfaces of the aircraft with and without magnification (e.g., 10× magnifications) to look for damage to the aircraft and performing relevant system checks. The extended conditional inspection for lightning strike damage can take a number of days to complete, can require a team of inspectors, and can require a facility that allows access to the entire external surface of the aircraft. The extended conditional inspection for lightning strike damage is performed at an airport where the aircraft landed after the lightning strike, or in some situations and under restricted operating conditions, the aircraft can be flown to a facility with the capability to perform the extended conditional inspection for lightning strike damage.

SUMMARY

In a particular implementation, a method of evaluating continued usage of a type of aircraft after a lightning strike includes performing, by a processor of a computing device, structure assessments of one or more structures of the type of aircraft based on one or more representative values for lightning strike damage for the type of aircraft. The method also includes setting, by the processor of the computing device, a number indicating how many flights the type of aircraft can fly after a lightning strike and before performing an extended conditional inspection for lightning strike damage.

In another particular implementation, an apparatus to evaluate continued usage of a particular type of aircraft after a lightning strike includes one or more processors and one or more memory devices coupled to the one or more processors. The one or more memory devices store instructions that are executable by the one or more processors to perform structure assessments of one or more structures of the type of aircraft based on one or more representative values for lightning strike damage for the type of aircraft. The instructions are further executable to set a number indicating how many flights the type of aircraft can fly after a lightning strike and before performing an extended conditional inspection for lightning strike damage.

In another particular implementation, a non-transitory, computer-readable medium stores instructions. The instructions are executable by a processor to perform operations. The operations include performing structure assessments of one or more structures of a type of aircraft based on one or more representative values for lightning strike damage for the type of aircraft. The operations also include setting a number indicating how many flights the type of aircraft can fly after a lightning strike and before performing an extended conditional inspection for lightning strike damage.

DETAILED DESCRIPTION

Figure 1:
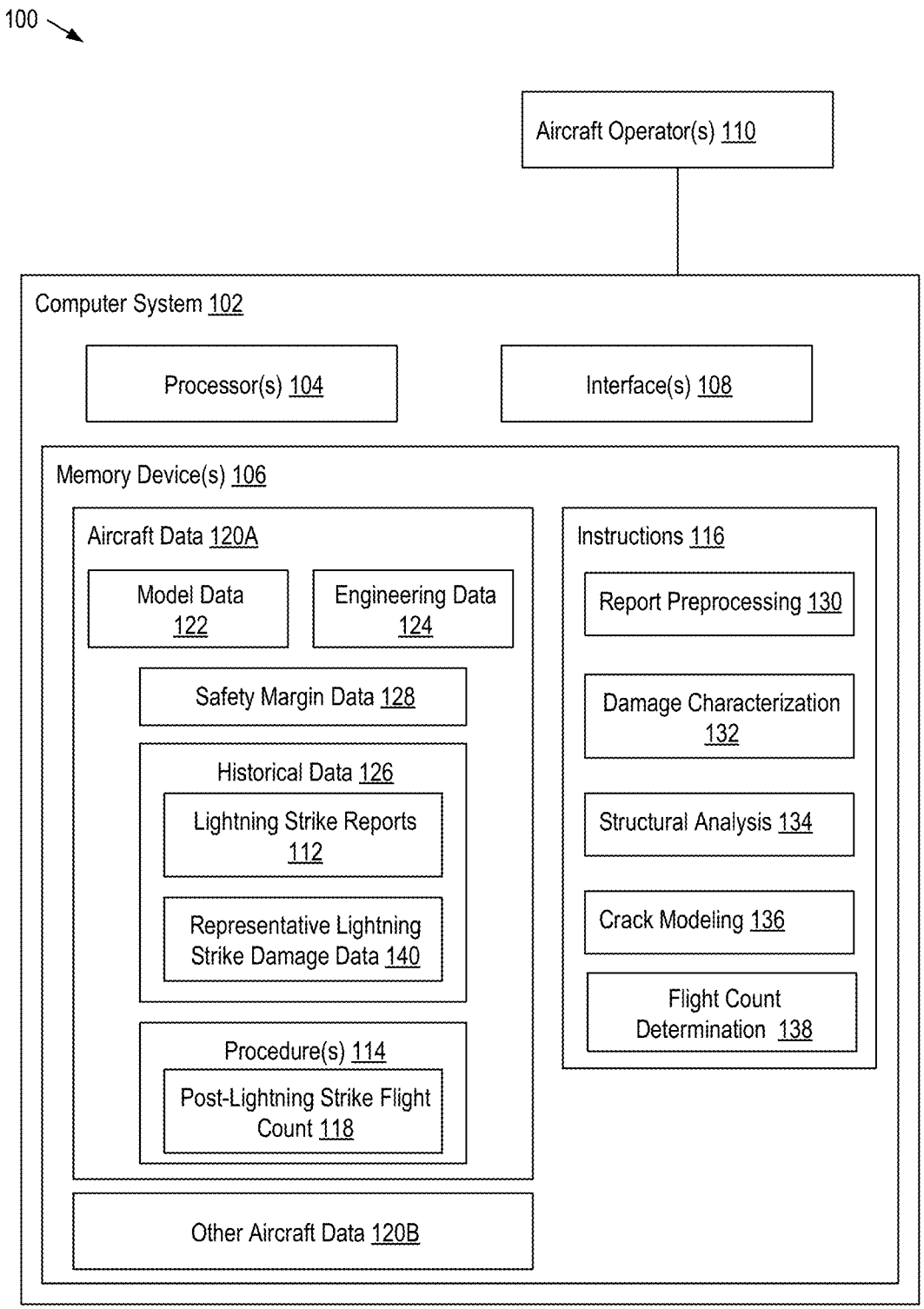
FIG. 1 is a diagram illustrating an example of a system to determine a number of flights that an aircraft can fly after experiencing a lightning strike before conducting a full extended conditional inspection for lightning strike damage.

Systems, apparatuses, methods, and computer-readable mediums disclosed herein are directed to enabling rigorous evaluation of reasonable (e.g., evidence-based, safe, and not unduly burdensome) operating limits for an aircraft after a lightning strike and before an extended conditional inspection for lightning strike damage of the aircraft. Since many lightning strikes result in little or no detectable damage to the aircraft, the time and cost associated with removing all aircraft from service after a lightning strike is overly restrictive and imposes unnecessary cost on operators associated with aircraft, and can cause unneeded delays for continued operations and users of aircraft (e.g., passengers).

The evaluation disclosed herein use historic lightning strike data for a particular type of aircraft along with engineering and design information about the aircraft to demonstrate that following many lightning strikes, an aircraft can operate safely for many flight cycles. Based on the results of this evaluation, safe and reasonable limits can be applied to the operation of the aircraft after a lightning strike. For example, rather than immediately removing an aircraft from service until a full extended conditional inspection for lightning strike damage can be performed, the disclosed methods enable a more limited inspection to be performed. For example, based on historical data, lightning strikes that merit removal for the aircraft from service result in significant visible damage to surfaces of the aircraft. Accordingly, a more limited inspection, referred to herein as a limited post-lightning strike inspection, can be performed to determine whether a lightning strike resulted in significant visible damage that may indicate underlying or less visible damage. If the limited post-lightning strike inspections indicate that the aircraft is operationally sound, the aircraft can be indicated to be safe for operation (including passenger service) for a threshold number of flights. The threshold number of flights is determined based on structural and engineering analysis of the same type of aircraft in view of the historical lightning strike data for that type of aircraft (and can include significant safety margins).

As one example, the limited post-lightning strike inspection can be a specifically designed inspection that includes a walk around of the aircraft to determine if lightning strike damage is visually observable. The limited post-lightning strike inspection can also include other steps, such as specific function checks of certain aircraft systems. The post-lightning strike inspection is a less extensive and less time consuming inspection than the extended conditional inspection for lightning strike damage, and can be performed at any airport rather than only at airports with special equipment.

Assuming the aircraft is deemed flight worthy based on the limited post-lightning strike inspection, the aircraft can be returned to service for the threshold number of flights. After or during the threshold number of flights, the aircraft undergoes the extended conditional inspection for lightning strike damage. Enabling commercial usage of the aircraft for the threshold number of flights based on the results of the limited post-lightning strike inspection reduces unplanned service disruptions to an operator associated with the aircraft and to customers scheduled to use the aircraft.

In a particular implementation, the threshold number is determined by an aircraft manufacturer who produced the aircraft. The threshold number is based on historical data descriptive of lightning strike damage that indicates actual damage that occurred to a type of aircraft corresponding to the aircraft due to lightning strikes. In another implementation, the threshold number is determined by the operator based on historical data descriptive of lightning strike data that indicates actual damage that occurred to a type of aircraft corresponding to the aircraft due to lightning strikes for aircraft used by the operator.

Particular implementations are described herein with reference to the drawings. In the description, common features are designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features referred to herein as a group or a type are (e.g., when no particular one of the features is being referenced), the reference number is used without a distinguishing letter. However, when one particular feature of multiple features of the same type is referred to herein, the reference number is used with the distinguishing letter. For example, referring to FIG. 1, aircraft data for multiple aircraft types is shown and associated with reference numbers 120A and 120B. When referring to a particular set of these aircraft data, such as the aircraft data 120A, the distinguishing letter "A" is used. However, when referring to any arbitrary set of aircraft data or to these aircraft data as a group, the reference number 120 is used without a distinguishing letter.

As used herein, various terminology is used for the purpose of describing particular implementations only and is not intended to be limiting. For example, the singular forms "a," "an," and "the" are intended to include the plural forms as well, unless the context clearly indicates otherwise. It may be further understood that the terms "comprise," "comprises," and "comprising" may be used interchangeably with "include," "includes," or "including". Additionally, it will be understood that the term "wherein" may be used interchangeably with "where." As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

In the present disclosure, terms such as "determining," "calculating," "generating," "adjusting," "modifying," etc. may be used to describe how one or more operations are performed. It should be noted that such terms are not to be construed as limiting and other techniques may be utilized to perform similar operations. Additionally, as referred to herein, "generating," "calculating," "using," "selecting," "accessing," and "determining" may be used interchangeably. For example, "generating," "calculating," or "determining" a parameter (or a signal) may refer to actively generating, calculating, or determining the parameter (or the signal) or may refer to using, selecting, or accessing the parameter (or signal) that is already generated, such as by another component or device. Additionally, "adjusting" and "modifying" may be used interchangeably. For example, "adjusting" or "modifying" a parameter may refer to changing the parameter from a first value to a second value (a "modified value" or an "adjusted value"). As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive electrical signals (digital signals or analog signals) directly or indirectly, such as via one or more wires, buses, networks, etc. As used herein, "directly coupled" may include two devices that are coupled (e.g., communicatively coupled, electrically coupled, or physically coupled) without intervening components.

FIG. 1 is a diagram illustrating an example of a system 100 to determine a number of flights that an aircraft can fly after experiencing a lightning strike before conducting a full extended conditional inspection for lightning strike damage. The system 100 includes a computer system 102 that includes one or more processors 104, one or more memory devices 106, and one or more interfaces 108. The interface(s) 108 include input/output interfaces, network interfaces, other communication interfaces, or a combination thereof. For example, in FIG. 1, the system 100 includes one or more aircraft operators 110 that can communicate with the computer system 102 via the interface(s) 108.

In a particular implementation, the computer system 102 is owned or operated by an aircraft manufacturer to enable the aircraft manufacturer to produce procedures for aircraft that the aircraft manufacturer manufactures. In this implementation, the aircraft manufacturer can obtain lightning strike reports 112 from the aircraft operators 110 and use the lightning strike reports 112 to generate or modify one or more procedure(s) 114 for the aircraft. In another implementation, the computer system 102 is owned or operated by one or more of the aircraft operator(s) 110 to enable the aircraft operator(s) 110 to generate or modify one or more internal procedures (e.g., the procedure(s) 114) for aircraft owned or operated by the aircraft operator(s) 110. In this implementation, the aircraft operator(s) 110 can use internal lightning strike reports 112, as well as lightning strike reports 112 from other sources, if such are available, to generate the procedures.

The memory device(s) 106 store instructions 116 that are executable by the processor(s) 104 to perform various operations associated with determining a post-lightning strike flight count 118 for a particular type of aircraft. The memory device(s) 106 also store aircraft data, such as aircraft data 120A for a first type of aircraft and, in some implementations, other aircraft data 120B for one or more other types of aircraft. The aircraft data 120A include information that the instructions 116 use to determine the post-lightning strike flight count 118 for a particular type of aircraft. For example, in FIG. 1, the information includes model data 122 and engineering data 124 associated with the particular type of aircraft. The engineering data 124 includes, for example, design and/or as-built information for the particular type of aircraft, such as descriptions of materials (e.g., material names and material properties) used in the aircraft, descriptions of aircraft structures (e.g., the sizes, shapes, and loads on various structures), tolerances associated with the aircraft, etc. The model data 122 includes, for example, drawings or models of various portions of the aircraft. The models can include two-dimensional (2D) or three-dimensional (3D) computer-aided design models, structural analysis models (e.g., finite element models), or other models used to characterize the aircraft itself or characteristics of the aircraft. The model data 122 is based on aircraft design information, testing, or both.

The memory device(s) 106 also store historical data 126 that includes information derived from historical lightning strike reports 112. For example, the historical data 126 can include information descriptive of locations and other characteristics of damage identified after lightning strikes. The memory device(s) 106 can also store the procedure(s) 114, which can indicate the post-lightning strike flight count 118, and various settings associated with generating the post-lightning strike flight count 118. For example, in FIG. 1, the memory device(s) 106 stores safety margin data 128, which specifies one or more safety margins used to determine the procedure(s) 114, the post-lightning strike flight count 118, or both. To illustrate, as explained further below, for some aircraft, analysis of the historical data 126 indicates that the post-lightning flight count is many tens or hundreds of flights that can be safely flown after a lightning strike before performing a full extended conditional inspection for lightning strike damage. However, an aircraft can often be rescheduled to enable performance of the extended conditional inspection after fewer flights than the post-lightning strike flight count while still avoiding unexpected delays due to lightning strike. Accordingly, the post-lightning strike flight count 118 can be set lower than a value determined via engineering analysis by the safety margin.

In FIG. 1, the instructions 116 are illustrated as including five functional modules, including report preprocessing instructions 130, damage characterization instructions 132, structural analysis instructions 134, crack modeling instructions 136, and flight count determination instructions 138. This division of the instructions 116 into five functional modules is merely to facilitate description of the various operations performed, and is not limiting. In other implementations, two or more of the functional modules can be combined in a single module or application. For example, a single procedure update application can include all five functional modules. In other implementations, one or more of the functional modules can be divided into two or more separate modules. For example, the report preprocessing instructions 130 can be divided into a set of instructions to parse and/or convert lightning strike reports 112 into a common format and another set of instructions to clean up or otherwise prepare data in the common format for use by the other functional modules.

The report preprocessing instructions 130 are executable, by the processor(s) 104, to extract data from lightning strike reports 112 and to prepare (e.g., normalize) the data for analysis by the other functional modules. For example, lightning strike reports 112 from different operators may be formatted differently, in which case, the report preprocessing instructions 130 can extract particular data from the lightning strike reports 112 and store the extracted data in a common format that is expected by the other functional modules. Such formatting can include adding data column, dropping data columns, and shifting or rearranging data columns. Further, in some implementations, the changing the format can include converting data between various formats. For example, some text can be converted to numeric values or vice versa. As another example, where measurements are indicated with units, the units can be converted (e.g., to convert between metric units and standard units). As another example, certain data that is not directly indicated in a lightning strike report 112 can be calculated based on values that are provided in the lightning strike report. To illustrate, a damage area can be calculated based on provided a damage diameter measurement indicated in the lightning strike report. As yet another example, certain data is removed if the data indicates repair work due to lightning strike damage as opposed to data indicating the lightning strike damage.

In some implementations, the report preprocessing instructions 130 also perform data clean-up operations. For example, the report preprocessing instructions 130 can use statistical analysis to identify and remove data elements that are statistical outliers. As another example, the report preprocessing instructions 130 can check for internal consistency of a lightning strike report. To illustrate, if the lightning strike report 112 indicates both a damage diameter and a damage area, the report preprocessing instructions 130 can calculate a range of plausible damage areas based on the damage diameter to determine whether the lightning strike report 112 is internally consistent. As another example, if the lightning strike report 112 includes photographs of damage areas, the report preprocessing instructions 130 can perform image analysis to determine whether the location, size, or severity of damage reported in the lightning strike report 112 is consistent with the damage areas represented in the photographs. If an inconsistency is identified in the lightning strike report, the lightning strike report 112 can be omitted from the historical data 126, tagged for review, or the more conservative value can be selected as the value to be used for subsequent evaluation.

In addition to converting, normalizing, and otherwise validating or modifying the lightning strike reports 112, in some implementations the report preprocessing instructions 130 also supplement the lightning strike reports 112. For example, the report preprocessing instructions 130 can cross-reference a lightning strike report 112 to other available data (e.g., the engineering data 124) to look up certain information that is used by other functional modules. For example, the structural analysis instructions 134 and the crack modeling instructions 136 use information about the type of material damaged, which may not be included in the lightning strike report. However, the report preprocessing instructions 130 can look up the type of material damaged in the engineering data 124 based on information identifying the aircraft (e.g., an aircraft tail number) and information indicating the location damaged.

The damage characterization instructions 132 perform statistical analysis of multiple lightning strike reports to generate representative lightning strike damage data 140, which identifies trends, ranges, averages, amounts of variation, or other statistical metrics related to the type and extent of damage experienced by multiple aircraft due to lightning strikes. For example, the damage characterization instructions 132 can determine, based on a set of lightning strike reports 112, a representative damage area for lightning strikes on a particular portion of an aircraft (e.g., on a wing, horizontal stabilizer, vertical stabilizer, fuselage crown, fuselage nose, etc.). As another example, the damage characterization instructions 132 can determine, based on a set of lightning strike reports 112, a representative damage depth for lightning strikes on a particular portion of an aircraft. A representative value determined by the damage characterization instructions 132 can include an average (mean, median, or mode), a range, or a worst-case estimate, a conservative estimate based on the average and a safety factor, or some other representative value. In some implementations, the damage characterization instructions 132 also determine the probability, based on the set of lightning strike reports 112, of lightning strikes occurring at various portions of the aircraft. Data determined by the damage characterization instructions 132 is added to the historical data 126 for use by the other functional modules.

The structural analysis instructions 134 are executable, by the processor(s) 104, to perform structural analysis of aircraft structure based on the model data 122, the engineering data 124, the historical data 126 (e.g., the representative lightning strike damage data 140), or a combination thereof. To illustrate, the structural analysis instructions 134 can access the historical data 126 to identify one or more structures to be analyzed, and can access the model data 122, the engineering data 124, or both, to analyze the structure. For example, the structural analysis instructions 134 can determine, from the representative lightning strike damage data 140 or other portions of the historical data 126, which structure or structures are most likely to be damaged by a lightning strike. In this example, the structural analysis instructions 134 can also determine representative characteristics of damage to the selected structure based on the representative lightning strike damage data 140 or other portions of the historical data 126. In this example, the structural analysis instructions 134 can obtain details of the structure to be analyzed, such as dimensions, material properties, initial finite elements model, etc., from the model data 122, the engineering data 124, or a combination thereof.

Using this information, the structural analysis instructions 134 can evaluate the structural integrity of the structure after incurring representative lightning strike damage indicated by the representative lightning strike damage data 140. For example, the representative lightning strike damage can indicate that modeled damage to a structure extends to a particular depth, over a particular area, at a particular location on the structure. In this example, the structural analysis instructions 134 can evaluate the static or dynamic properties of the structure (e.g., load bearing capability, deformation limits, etc.). In some implementations, the structural analysis instructions 134 perform the structural analysis dynamically. For example, the structural analysis instructions 134 modifies a base-finite element model of the structure to account for the representative lightning strike damage, and uses the modified finite element model to determine the properties of the structure. In other implementations, the structural analysis instructions 134 access predetermined structural information based on the structure damaged, the location damaged, and the extent of the damage. For example, the model data 122 or the engineering data 124 can include one or more look-up tables indicating properties of various aircraft structures in view of different damage situations.

Results produced by the structural analysis instructions 134 can be compared to operational or design characteristics associated with the particular type of aircraft being evaluated. For example, a particular aircraft type can be specified or designed to have a wing spar capable of supporting a particular dynamic load during flight. In this example, if the wing spar is modeled for lightning strike damage, the structural analysis instructions 134 can compare the dynamic load capability of the wing spar to the specified wing spar capability to determine whether the wing spar is flight worthy if damaged according to the representative lightning strike damage.

In some implementations, if the structural analysis instructions 134 determine that a particular structure is not flight worthy after incurring the representative lightning strike damage, the structural analysis instructions 134 can update procedure(s) 114. For example, the post-lightning strike flight count 118 can be set to a zero value to indicate that the aircraft should not be returned to service after a lightning strike to the particular structure until a full extended conditional inspection for lightning strike damage is performed. If the structural analysis instructions 134 determine that the structure is flight worthy after incurring the representative lightning strike damage, the structural analysis instructions 134, the crack modeling instructions 136, or both sets of instructions working in conjunction, determine a number of flight cycles that the aircraft remains flight worthy (within a specified safety margin) after incurring the representative lightning strike damage.

The crack modeling instructions 136 are executable, by the processor(s) 104, to perform crack initiation and propagation modeling to determine the fatigue impact of the representative lightning strike damage. For example, the crack modeling instructions 136 can estimate the probability of crack formation and the rate of crack growth based on loads that the structure is subjected to during flight. Crack modeling performed by the crack modeling instructions 136 can be used to determine a number of flight cycles that the aircraft remains flight worthy after the structure incurs the representative lightning strike damage.

The flight count determination instructions 138 are executable, by the processor(s) 104, to set the post-lightning strike flight count 118. For example, the number of flight cycles that the aircraft remains flight worthy after the structure incurs the representative lightning strike damage indicated by the crack modeling instructions 136 can be compared to a threshold indicated in the safety margin data 128. If the number of flight cycles that the aircraft remains flight worthy is less than the threshold, the post-lightning strike flight count 118 can be set to zero to indicate that the aircraft should not be returned to service after a lightning strike to the particular structure until a full extended conditional inspection for lightning strike damage is performed. If the number of flight cycles that the aircraft remains flight worthy is greater than the threshold, the post-lightning strike flight count 118 can be set to a value N, wherein N is an integer greater than or equal to 1 and less than the number of flight cycles that the aircraft remains flight worthy indicated by the crack modeling instructions 136. For example, the value N can be determined as the number of flight cycles that the aircraft remains flight worthy minus a safety margin. In some implementations, the value N has an upper limit set to enable the aircraft operators 110 to adjust a schedule to move the aircraft to a location at which the full extended conditional inspection for lightning strike damage can be performed. For example, the value N can be capped at 5 to 10 flights even if the number of flight cycles that the aircraft remains flight worthy is hundreds or even thousands of flights.

Setting the post-lightning strike flight count 118 to N indicates that the aircraft can, under some circumstances, be returned to service after a lightning strike to the particular structure before performing a full extended conditional inspection. For example, a limited post-lightning strike inspection can be performed to confirm that the damage to the particular structure (or other portions or systems of the aircraft) is within a specified range corresponding to the representative lightning strike damage modeled by the structural analysis instructions 134 and the crack modeling instructions 136. In some implementations, the specified range or other conditions of the limited post-lightning strike inspection can be indicated in operational guidance (e.g., the procedure(s) 114) provided to the aircraft operators 110 by the computer system 102. For example, the computer system 102 can generate output indicating or updating procedure(s) 114 for various types of aircraft and for lightning strikes at various locations. In this example, the procedure(s) 114 are based on the representative lightning strike damage data 140 modeled and account for safety margins to enable a less burdensome inspection to be performed before temporarily returning the aircraft to service for a specified number of flights. For example, the procedure(s) 114 can indicate one or more locations to be inspected for damage based on the representative lightning strike damage data 140. As another example, the procedure(s) 114 can describe types of damage (e.g., location or extent of damage) that preclude flight without performing an extended conditional inspection for lightning strike damage based on the representative lightning strike damage data 140. As yet another example, the procedure(s) 114 can describe types of damage (e.g., location or extent of damage) that can be present while the aircraft remains flight worth for the threshold number of flights without performing an extended conditional inspection for lightning strike damage based on the representative lightning strike damage data 140.

Figure 2:
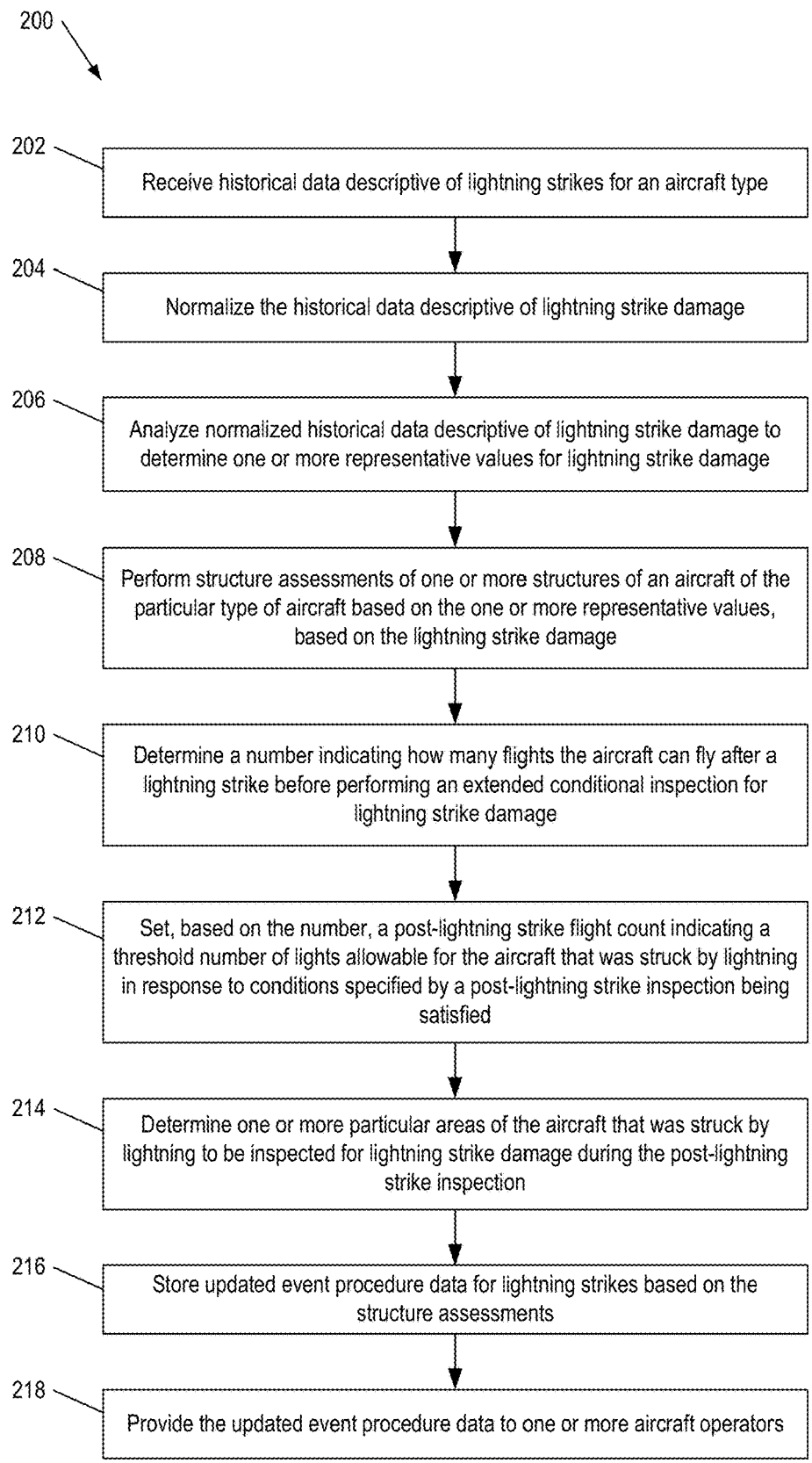
FIG. 2 is a flow chart illustrating an example of a method of updating event procedure data for lightning strikes based on a threshold number of flights that a particular type of aircraft can make after an aircraft of the type of aircraft is struck by lightning under certain circumstances.

FIG. 2 is a flow chart illustrating an example of a method 200 of determining event procedure data for lightning strikes based on the post-lightning strike flight count 118 associated with a particular type of aircraft. The method can be performed by the computer system 102 of FIG. 1.

The method 200 includes, at 202, receiving historical data descriptive of lightning strikes on aircraft of the particular aircraft type. For example, the historical data descriptive of lightning strikes can correspond to the historical data 126 of FIG. 1, or a portion thereof. The historical data descriptive of lightning strikes can be determined based on the lightning strike reports 112 from a particular aircraft operator or from more than one aircraft operator. To illustrate, an aircraft manufacturer can request historical data descriptive of lightning strike damage from multiple of the aircraft operators 110 of FIG. 1. For example, the lightning strike reports 112 can include an identifier of the aircraft struck by lightning, an identifier of the type of the aircraft, when the aircraft was struck by lightning, locations of damage to the aircraft, descriptions of the extent of damage, images of the damage, other information, or a combination thereof.

The method 200 also includes, at 204, normalizing the historical data descriptive of lightning strike damage. For example, the report preprocessing instructions 130 can normalize the historical data descriptive of lightning strike damage. In this example, normalize the historical data descriptive of lightning strike damage can include extracting data from the lightning strike reports 112 and preparing the data for analysis, as described with reference to FIG. 1.

Figure 3:
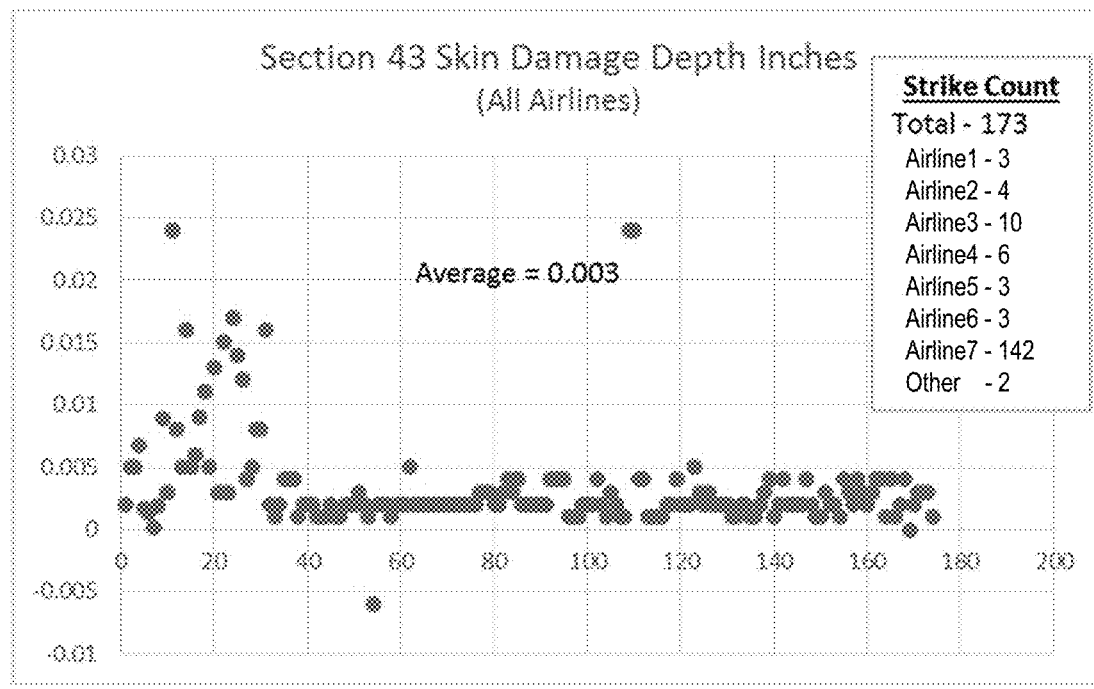
FIG. 3 is a graphic representation of skin damage depth for lightning strike to a particular section of a particular type of aircraft.

The method 200 further includes, at 206, after the historical data descriptive of lightning strike damage is normalized to generate normalized historical data descriptive of lightning strike damage, analyzing the normalized historical data descriptive of lightning strike damage to determine one or more representative values for lightning strike damage. For example, the damage characterization instructions 132 can determine representative lightning strike damage (e.g., the representative lightning strike damage data 140) for various structures of the aircraft, as described with reference to FIG. 1. In some implementations, representative values are determined for different characteristics of damage (e.g., skin damage depth, skin damage area, damage depth to damage area ratio, combined fastener and skin damage area, etc.). Representative values can be determined for each section or structure of the aircraft. For example, FIG. 3 depicts a graphic representation of skin damage depth for lightning strike to a particular section of a particular type of aircraft. FIG. 3 shows that for 173 lightning strike incidents, the average skin damage depth that occurred in the particular section of the particular type of plane was 0.003 inches, that the largest skin depth damage was about 0.024 inches, and that the smallest skin depth damage was about 0.000 inches (e.g., undetectable). In this example, the representative lightning strike damage data 140 can indicate a skin damage depth of about 0.003 inches (plus or minus a safety factor) if the average skin depth damage is used as the representative skin depth damage. In another example, the representative lightning strike damage data 140 can indicate a skin damage depth of about 0.024 inches (plus or minus a safety factor) if the maximum skin depth damage is used as the representative skin depth damage.

The method 200 further includes, at 208, performing structure assessments of one or more structures of an aircraft of the particular type of aircraft based on the one or more representative values. For example, the structure assessments can be performed by the structural analysis instructions 134, the crack modeling instructions 136, or both, as described with reference to FIG. 1. In some circumstances, results of the structure assessments may indicate that the aircraft should not be returned to service until a complete extended conditional inspection for lightning strike damage is performed. In such circumstances, the post-lightning strike flight count 118 can be set to zero. In other circumstances, the results of the structure assessments may indicate that the aircraft remains flight worthy after incurring the representative lightning strike damage, in which case the crack modeling instructions 136 can perform additional structure assessments to set the post-lightning strike flight count 118.

The method 200 also includes, at 210, determining a number indicating how many flights the aircraft can fly after a lightning strike before performing an extended conditional inspection for lightning strike damage. The method 200 also includes, at 212, setting, based on the number, the post-lightning strike flight count 118 indicating a threshold number of flights allowable for the aircraft that was struck by lightning in response to conditions specified by a post-lightning strike inspection being satisfied. For example, the flight count determination instructions 138 sets the post-lightning strike flight count 118 based on output of the crack modeling instructions 136, the structural analysis instructions 134, the safety margin data 128, or a combination thereof, as described with reference to FIG. 1. The post-lightning strike flight count 118 indicates a threshold number of flights allowable for an aircraft of the particular type of aircraft in response to the aircraft satisfying a post-lightning strike inspection indicated in the procedure(s) 114. The post-lightning strike inspection may be based on the representative lightning strike damage.

In some implementations, the threshold number is set less than a number of use cycles associated with insignificant risk to the aircraft becoming non-flight worthy (e.g., a one in a billion probability value of non-flight worthiness for the number of cycles). For example, if the structure assessment indicates that the type of aircraft can be subjected to 2000 additional flight cycles with less than a one in a billion chance of continued use causing non-flight worthiness of the aircraft during the flight cycles when the structure includes the representative lightning strike damage, the threshold number of flights can be set to less than 2000, such as to 10, 50, or 100.

The method 200 further includes, at 214, determining one or more particular areas of the aircraft that was struck by lightning to be inspected for lightning strike damage during the post-lightning strike inspection. For example, when the structure assessments of one or more structures of the aircraft of the particular type of aircraft indicate that damage to the particular areas results in the number being zero for data included in the normalized historical data, the computer system 102 indicates that the particular areas are to be inspected for damage during the post-lightning strike inspection indicated in the procedure(s) 114.

In the example illustrated in FIG. 2, the method 200 further includes, at 216, storing updated event procedure data for lightning strikes based on the structure assessments. The updated event procedures incorporate use of the threshold number for aircraft that have been struck by lightning and that satisfy a limited post-lightning strike inspection of the aircraft. The limited post-lightning strike inspection can be a specifically designed based on the representative lightning strike damage used to determine the threshold number. For example, the procedure(s) 114 can specify operations to be performed during a limited post lightning strike inspection, such as instructions for inspecting particular areas of the aircraft. The method 200 further includes, at 218, includes providing the updated event procedure data to one or more aircraft operators, such as the aircraft operator 110 of FIG. 1.

Figure 4:
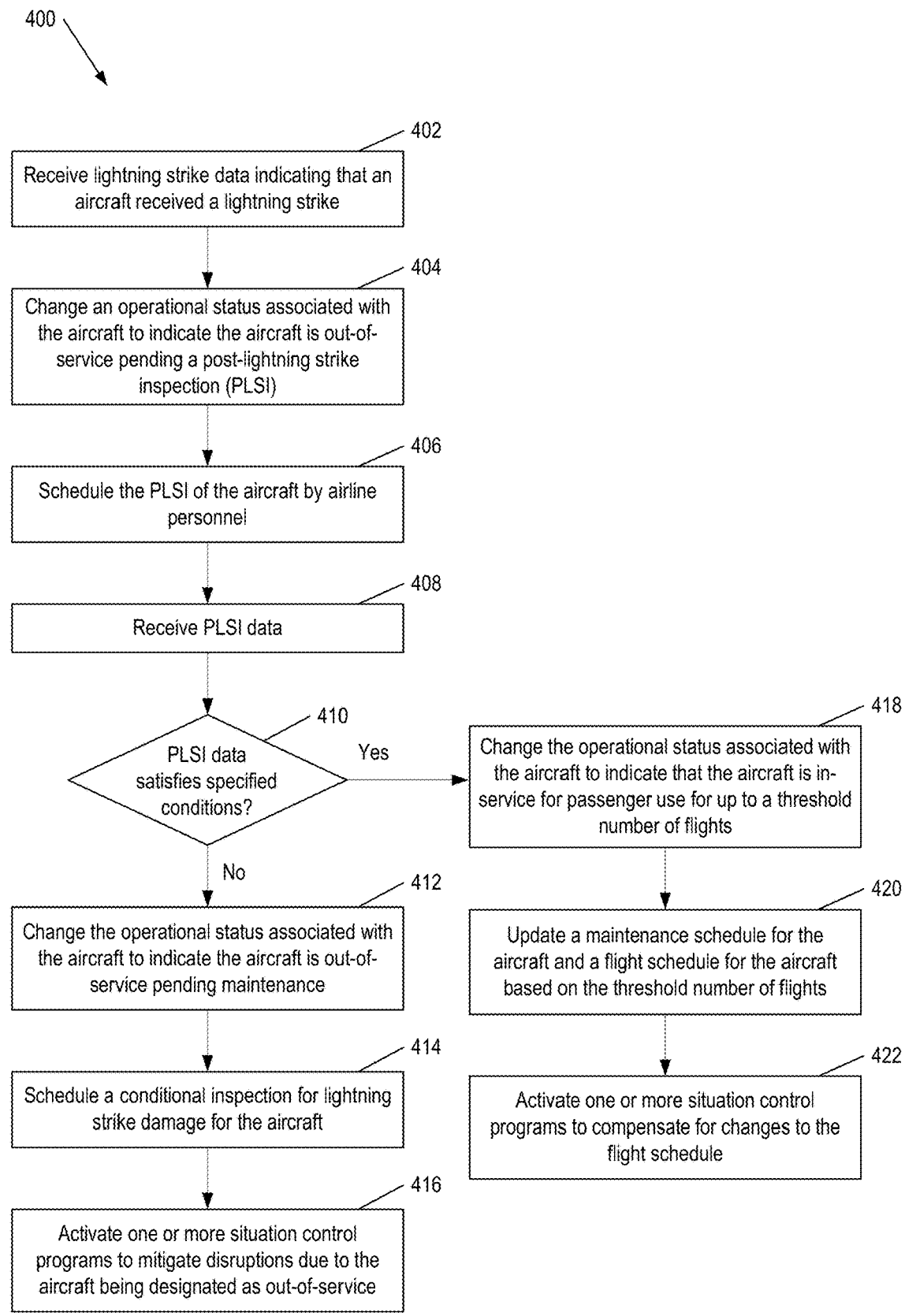
FIG. 4 is a flow chart illustrating an example of a method of enabling usage of an aircraft after a lightning strike and before an extended conditional inspection for lightning strike damage.

FIG. 4 is a flow chart illustrating an example of a method 400 of enabling usage of an aircraft after a lightning strike and before an extended conditional inspection for lightning strike damage. The method 400 can be performed by a computer system, such as the computer system 102 of FIG. 1 or a computing system of one of the aircraft operators 110 of FIG. 1.

The method 400 includes, at 402, receiving lightning strike data indicating that an aircraft received a lightning strike. The lightning strike data can be based on observations of a flight crew of the aircraft, based on information received from airport personnel, based on information received from a computer system of the aircraft, or based on information received from other sources.

The method 400 includes, at 404, changing a status associated with the aircraft to indicate that the aircraft is out-of-service pending a post-lightning strike inspection of the aircraft. The method 400 also includes, at 406, scheduling the post-lightning strike inspection of the aircraft by operator personnel. For example, the operator personnel can include maintenance personnel, one or more members of a flight crew (e.g., a pilot, co-pilot, or both), or combinations thereof. A procedure 114 for the post-lightning strike inspection can include a checklist of locations to visually inspect the aircraft and can include operational checks associated with various aircraft systems. The check list for the post-lightning strike inspection can be part of an application embodied in an electronic device (e.g., a portable electronic device).

The method 400 further includes, at 408, receiving post-lightning strike inspection data. The post-lightning strike inspection data can be entered manually into the computer system or can be transferred electronically from an electronic device used during the post-lightning strike inspection.

The method 400 includes, at 410, determining whether the post-lightning strike inspection data satisfied specified conditions, such as detection of no visible damage or damage of an extent less than the representative lightning strike damage used to model a particular structure of the aircraft. When the post-lightning strike inspection data fails to satisfy the specified conditions, the method 400 includes, at 412, changing the status associated with the aircraft to out-of-service pending maintenance, and at 414, scheduling the extended conditional inspection for lightning strike damage. The method 400 also includes, at 416, activating one or more situation control programs to mitigate disruptions due to the aircraft being designated as out-of-service. The one or more situation control programs can delay one or more flights, cancel one or more flights, find a substitute aircraft for flights of the aircraft indicated in a flight schedule, change flight schedules for one or more aircraft to compensate for the out-of-service aircraft, handle passenger or other operational issues (e.g., cargo movement), or combinations thereof. The method 400 then ends.

When the post-lightning strike inspection data satisfies the specified conditions, at 410, the method 400 includes, at 418, changing the operational status associated with the aircraft to indicate that the aircraft is in-service for passenger use, or other operational use (e.g., cargo mover, fuel delivery to other airborne aircraft, water delivery to fires, etc.), for up to a threshold number of flights, where the threshold number of flights is indicated by the post-lightning strike flight count 118 associated with the aircraft and a particular structure that was damaged, if any.

The method 400 also includes, at 420, updating a maintenance schedule for the aircraft and a flight schedule for the aircraft based on the threshold number of flights, and at 422, activating one or more situation control programs to compensate for changes to the flight schedule for the aircraft. The method 400 then ends.

Figure 5:
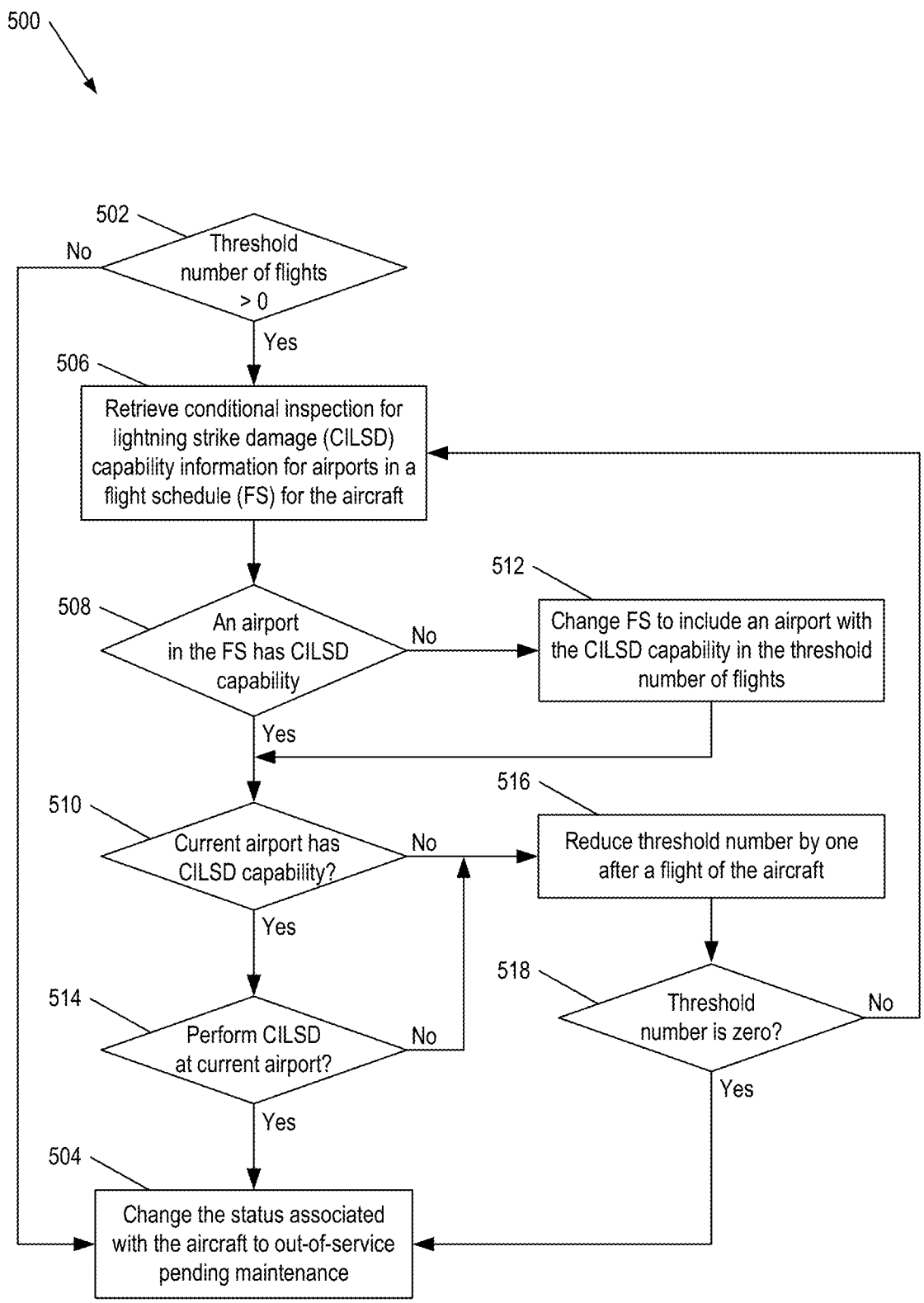
FIG. 5 is a flow chart illustrating an example of a method of operation of an aircraft designated as in-service for passenger use, or other operational use, for up to a threshold number of flights.

FIG. 5 is a flow chart illustrating an example of a method 500 of operation of an aircraft designated as in-service for passenger use, or other operational use, for up to a threshold number of flights. In a particular implementation, the method 500 can be performed by a computer system, such as the computer system 102 or a computer system of one of the aircraft operators 110 of FIG. 1.

The method 500 includes, at 502, determining whether the threshold number of flights is greater than zero. When the threshold number of flights is not greater than zero, at 502, the computer system changes a status of the aircraft to out-of-service pending maintenance, at 504, and the method 500 ends.

When the threshold number is greater than zero, at 502, the method 500 includes, at 506, retrieving extended conditional inspection for lightning strike damage capability information for airports in a flight schedule for the aircraft. The flight schedule for the aircraft is retrieved from a database. The method 500 also includes, at 508, determining whether an airport in the flight schedule has extended conditional inspection for lightning strike damage capability. An airport has extended conditional inspection for lightning strike damage capability when the airport has sufficient available facilities, equipment, and personnel to support performance of the extended conditional inspection for lightning strike damage.

When the determination at 508 indicates that an airport in the flight schedule has the extended conditional inspection for lightning strike damage capability, the method 500 includes determining whether the current airport where the aircraft is located has the extended conditional inspection for lightning strike damage capability, at 510. When the determination at 508 is that no airport in the flight schedule has the extended conditional inspection for lightning strike damage capability, the method 500 includes, at 512, changing the flight schedule to include an airport with the extended conditional inspection for lightning strike damage capability in the threshold number of flights. The method 500 then proceeds to 510.

When the determination at 510 is that the current airport where the aircraft is located has the extended conditional inspection for lightning strike damage capability, the method 500 includes, at 514, determining whether to perform the extended conditional inspection for lightning strike damage at the current airport. The determination at 514 can be based on the threshold number, scheduled availability for an extended conditional inspection for lightning strike damage at the airport, availability of a substitute aircraft to take over any remaining flights in the flight schedule, subsequent destinations for the aircraft indicated in the flight schedule, other factors, or combinations thereof.

When the determination at 510 is that the current airport where the aircraft is located does not have the extended conditional inspection for lightning strike damage capability, the method includes, at 516, reducing the threshold number by one after a flight of the aircraft. The flight schedule for the aircraft is updated to reflect completion of the flight.

The method 500 then includes, at 518, determining whether the threshold number is zero. If the threshold number is zero, at 518, the method 500 proceeds to 504 where the status of the aircraft is changed to out-of-service pending maintenance. The method 500 then ends. When the determination at 518 is that the threshold number is not zero, the method 500 proceeds to 506, where the extended conditional inspection for lightning strike damage capability information for the airports in the flight schedule for the aircraft are retrieved, and the method 500 continues.

When the determination at 514 is not to perform the extended conditional inspection for lightning strike damage at the current airport, the method 500 proceeds to 516 where the threshold number is reduced by one after a flight of the aircraft. The method 500 then continues. When the determination at 514 is to perform the extended conditional inspection for lightning strike damage at the current airport, the method proceeds to 504 where the status of the aircraft is changed to out-of-service pending maintenance. The method 500 then ends.

Figure 6:
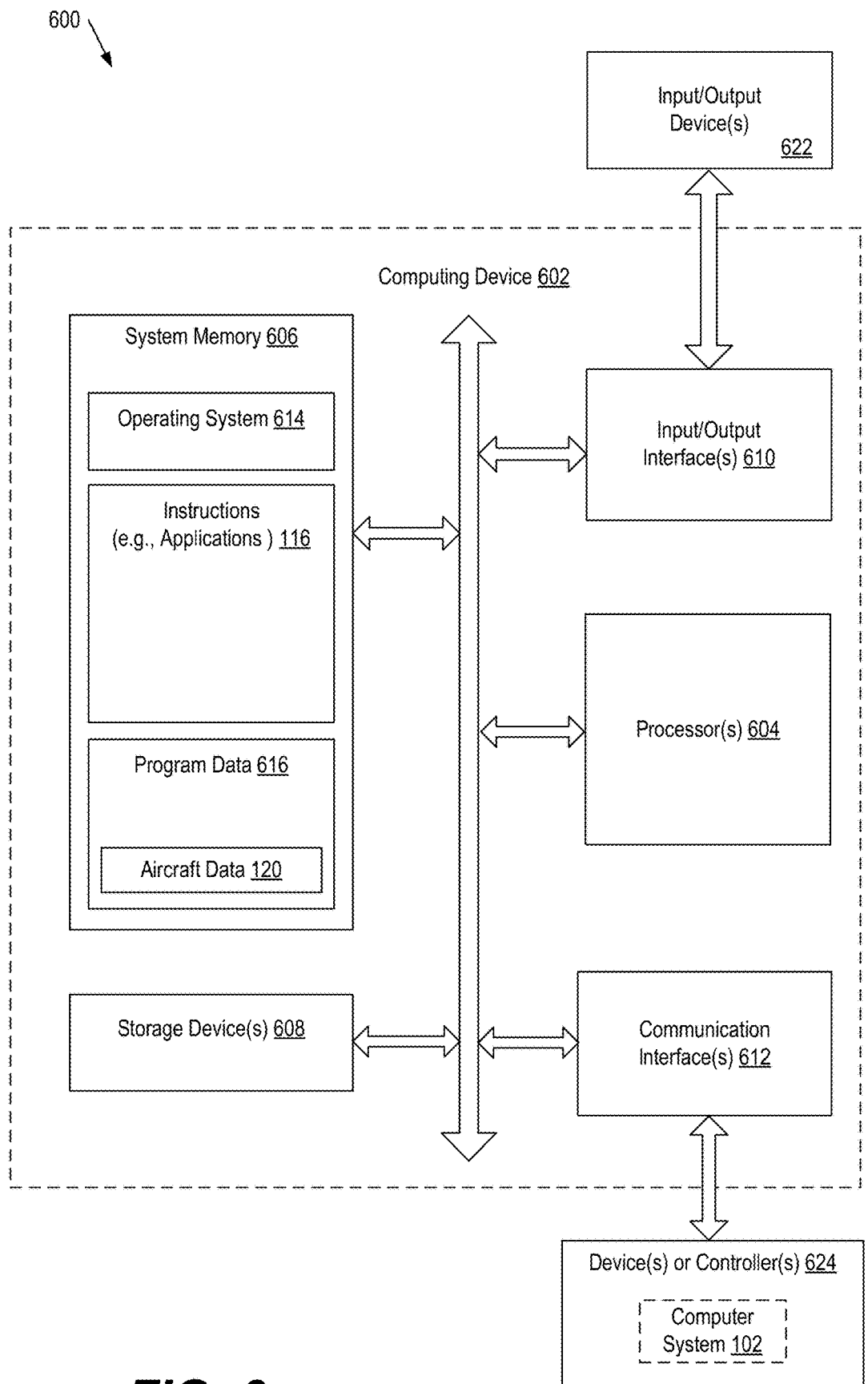
FIG. 6 is a block diagram that illustrates a particular implementation of a computing environment including a computing device.

FIG. 6 is a block diagram of a computing environment 600. The computing environment 600 can include, be included within, or be coupled to the system 100 of FIG. 1. For example, the computing environment 600 includes a computing device 602 which can correspond to the computer system 102 of FIG. 1 or a computing device of one of the aircraft operators 110 of FIG. 1.

The computing device 602 includes one or more processors 604. Within the computing device 602, the one or more processors 604 communicate with a system memory 606, one or more storage devices 608, one or more input/output interfaces 610, one or more communication interfaces 612, or a combination thereof.

The system memory 606 includes non-transitory computer-readable media implemented as physical devices, and is not merely a signal (or signals) without an associated physical device. The system memory 606 includes volatile memory devices (e.g., random access memory (RAM) devices), nonvolatile memory devices (e.g., read-only memory (ROM) devices, programmable read-only memory, and flash memory), or both. The system memory 606 includes an operating system 614, which in some implementations includes a basic input/output system for booting the computing device 602 as well as a full operating system to enable the computing device 602 to interact with users, other programs, and other devices. The system memory 606 also includes the instructions 116 described with reference to FIG. 1. The system memory 606 also includes program data 616, which includes the aircraft data 120 described with reference to FIG. 1.

The one or more storage devices 608 include nonvolatile storage devices, such as magnetic disks, optical disks, flash memory devices, or combinations thereof. In some implementations, the one or more storage devices 608 include both removable and non-removable memory devices. In a particular implementation, the one or more storage devices 608 are configured to store the operating system 614, the instructions 116, the program data 616, or a combination thereof.

In a particular implementation, the one or more processors 604 are configured to execute instructions, such as the instructions 116, stored at the system memory 606. The instructions 116 are executable to cause the one or more processors 604 to perform various operations.

The one or more input/output interfaces 610 enable the computing device 602 to communicate with one or more input/output devices 622 to facilitate user interaction. For example, the one or more input/output interfaces 610 are adapted to receive input from a user, to receive input from another computing device, or a combination thereof. In some implementations, the input/output interfaces 610 conform to one or more standard interface protocols, including serial interfaces (e.g., universal serial bus (USB) interfaces), parallel interfaces, display adapters, audio adapters, custom interfaces, or combinations thereof. In some implementations, the input/output devices 622 include user interface devices and displays, including some combination of buttons, keyboards, pointing devices, displays, speakers, microphones, touch screens, and other devices. In some implementations, the one or more processors 604 detect interaction events based on user input received via the input/output interfaces 610. Additionally, in some implementations, the one or more processors 604 send a display to a display device via the input/output interfaces 610.

The one or more communication interfaces 612 enable the computing device 602 to communicate with one or more other computing devices or controllers 624. For example, in implementations in which the computing device 602 corresponds to a computing device of one of the aircraft operators 110, the one or more communication interfaces 612 enable the computing device 602 to communicate with the computer system 102 of FIG. 1.

The one or more communication interfaces 612 can include wired Ethernet interfaces, radiofrequency wireless interfaces, electrical (or power line) interfaces, optical or radio frequency interfaces, or other wired interfaces, other wireless interfaces, or combinations thereof. The other computing devices or controllers 624 can include host computers, servers, workstations, portable computers, telephones, tablet computers, or any other communication device or component, as non-limiting examples.

Although one or more of FIGS. 1-6 may illustrate systems, apparatuses, and/or methods according to the teachings of the disclosure, the disclosure is not limited to these illustrated systems, apparatuses, and/or methods. One or more functions or components of any of FIGS. 1-6 as illustrated or described herein may be combined with one or more other portions of another of FIGS. 1-6. Accordingly, no single implementation described herein should be construed as limiting and implementations of the disclosure may be suitably combined without departing form the teachings of the disclosure.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A method of evaluating continued usage of an aircraft of a type of aircraft after a lightning strike to the aircraft, the method comprising:
    performing, by a processor of a computing device, structure assessments of one or more structures of the type of aircraft based on one or more representative values for lightning strike damage for the type of aircraft, wherein performing the structure assessments comprises modeling the one or more structures based on the one or more representative values for lightning strike damage, and wherein the one or more representative values for lightning strike damage for the type of aircraft are based on historical data for lightning strike damage to the type of aircraft; and
    determining, by the processor of the computing device, a number indicating how many flights the aircraft of the type of aircraft can fly after the lightning strike to the aircraft and before performing an extended conditional inspection for lightning strike damage.

2. The method of claim 1, further comprising;
    receiving, at the computing device, the historical data; and
    normalizing the historical data to determine the one or more representative values.

3. The method of claim 2, wherein normalizing the historical data includes removing particular data from the historical data.

4. The method of claim 2, wherein normalizing the historical data includes supplementing the historical data with engineering data associated with the type of aircraft.

5. The method of claim 2, wherein the representative values are descriptive of extents of lightning strike damage associated with multiple lightning strike reports.

6. The method of claim 1, further comprising storing updated event procedure data for lightning strikes based on the structure assessments.

7. The method of claim 6, wherein the updated event procedure data for lightning strikes specifies to change an operational status of a first aircraft of the type of aircraft that was struck by lightning to indicate that the first aircraft is out-of-service pending maintenance responsive to a post-lightning strike inspection of the first aircraft indicating visual damage to the first aircraft.

8. The method of claim 6, further comprising providing the updated event procedure data to one or more aircraft operators.

9. The method of claim 1, wherein the number is used by one or more computing systems to cause modification of a maintenance schedule for the aircraft to include the extended conditional inspection for lightning strike damage before flights of the aircraft reach the number.

10. The method of claim 1, wherein the performing the structure assessments includes modeling crack initiation and crack propagation in the one or more structures.

11. An apparatus to evaluate continued usage of an aircraft of a type of aircraft after a lightning strike to the aircraft, the apparatus comprising:
one or more processors; and
one or more memory devices coupled to the one or more processors, the one or more memory devices storing instructions executable by the one or more processor to:
perform structure assessments of one or more structures of the type of aircraft based on one or more representative values for lightning strike damage for the type of aircraft, wherein performing the structure assessments comprises modeling the one or more structures based on the one or more representative values for lightning strike damage, and wherein the one or more representative values for lightning strike damage for the type of aircraft are based on historical data for lightning strike damage to the type of aircraft; and
determine a number indicating how many flights the aircraft of the type of aircraft can fly after the lightning strike to the aircraft and before performing an extended conditional inspection for lightning strike damage.

12. The apparatus of claim 11, wherein the historical data is received from one more aircraft operators that utilize the type of aircraft.

13. The apparatus of claim 11, wherein the instructions further comprise particular instructions executable by the one or more processors to set, based on the number, a post-lightning strike flight count indicating a threshold number of flights allowable for the aircraft of the type of aircraft that was struck by lightning in response to conditions specified by a post-lightning strike inspection being satisfied.

14. The apparatus of claim 11, wherein the instructions further comprise particular instructions executable by the one or more processors to determine one or more particular areas of the aircraft of the type of aircraft to be inspected for lightning strike damage during a post-lightning strike inspection.

15. The apparatus of claim 11, wherein the structure assessments modeling the one or more structures are based on the one or more representative values for lightning strike damage.

16. A non-transitory, computer-readable medium storing instructions, the instructions executable by a processor to perform operations, the operations comprising:
performing structure assessments of one or more structures of a type of aircraft based on one or more representative values for lightning strike damage for the type of aircraft, wherein performing the structure assessments comprises modeling the one or more structures based on the one or more representative values for lightning strike damage, and wherein the one or more representative values for lightning strike damage for the type of aircraft are based on historical data for lightning strike damage to the type of aircraft; and
determining a number indicating how many flights an aircraft of the type of aircraft can fly after a lightning strike to the aircraft and before performing an extended conditional inspection for lightning strike damage.

17. The non-transitory, computer-readable medium of claim 16, wherein the operations further comprise storing updated event procedure data for lightning strikes based on the structure assessments.

18. The non-transitory, computer-readable medium of claim 17, wherein the updated event procedure data identifies a procedure for one or more aircraft personnel to inspect the aircraft.

19. The non-transitory, computer-readable medium of claim 16, wherein the number is used by one or more computing systems to cause modification of a maintenance schedule for the aircraft to include the extended conditional inspection for lightning strike damage before flights of the aircraft reach the number.

20. The non-transitory, computer-readable medium of claim 16, wherein the representative values are descriptive of locations of lightning strike damage and extents of lightning strike damage associated with multiple historical lightning strike reports associated with the type of aircraft.

* * * * *